United States Patent [19]

Bowden et al.

[11] Patent Number: 4,462,094
[45] Date of Patent: Jul. 24, 1984

[54] METHOD AND APPARATUS FOR DETERMINING ANGLE OF INCLINATION OF SEISMOMETER AND LEVELING SEISMIC MOTION DETECTORS

[75] Inventors: Edgar A. Bowden, Arlington; Maurice J. Prior, Duncanville, both of Tex.

[73] Assignee: Mobil Oil Corporation, New York, N.Y.

[21] Appl. No.: 161,465

[22] Filed: Jun. 19, 1980

[51] Int. Cl.³ .............................................. G01V 1/38
[52] U.S. Cl. ..................................... 367/188; 367/173; 181/401; 33/308; 33/1 E
[58] Field of Search ............... 367/179, 141, 188, 173; 181/401; 73/102, 2, 652, 382; 137/45; 74/531.2; 33/1 E, 1 HH, 304, 308

[56] References Cited

U.S. PATENT DOCUMENTS

| | | | |
|---|---|---|---|
| 1,738,589 | 12/1929 | Koppl | 33/308 |
| 2,551,417 | 5/1952 | Carlisle | 367/173 |
| 2,615,248 | 10/1952 | Hildebrandt | 33/1 E |
| 3,731,264 | 5/1973 | Campbell et al. | 367/173 |
| 3,818,425 | 6/1974 | Brynand et al. | 367/12 |
| 4,292,861 | 10/1981 | Thornhill et al. | 73/382 R |
| 4,300,254 | 11/1981 | Prior | 114/331 |

FOREIGN PATENT DOCUMENTS

| | | | |
|---|---|---|---|
| 124917 | 5/1949 | Sweden | 367/12 |
| 23003 | of 1908 | United Kingdom | 33/304 |
| 757695 | 6/1978 | U.S.S.R. | 33/304 |

OTHER PUBLICATIONS

Francis et al., "Experience . . . Ocean Bottom Seismograph", pp. 143-150, Marine Geophysical Researches, 3, 1977.
Francis et al., "Ocean Bottom Seismograph", 1975, pp. 195-213, Marine Geophysical Researches, 2.
Prothero, "An . . . Ocean Bottom Seismometer Capsule", U. of Calif., Project USDC R/E-15.

Primary Examiner—Nelson Moskowitz
Attorney, Agent, or Firm—A. J. McKillop; M. G. Gilman; Frank J. Kowalski

[57] ABSTRACT

A geophone is hung from a ball bearing in a pendular fashion so that it is free to swing in any direction. Because it is weighted, it will assume the correct positioning for operation. A clamp, carried with the pendular geophone in a seismometer designed for use on the ocean floor, fixes the geophone in a rigid position when a solenoid is actuated. After the seismometer is deployed on the sea bottom, it is desired to clamp the geophone into its assumed position. The solenoid is fired upon command causing the ball to be clamped. When the seismometer is recovered the angle of inclination with respect to the vertical it assumed at the time when the geophone was clamped can be determined by measuring the angle formed by the clamped geophone and a surface known to be vertical when the seismometer rests on a flat, horizontal surface.

6 Claims, 3 Drawing Figures

METHOD AND APPARATUS FOR DETERMINING ANGLE OF INCLINATION OF SEISMOMETER AND LEVELING SEISMIC MOTION DETECTORS

BACKGROUND OF THE INVENTION

This invention relates to seismometers, especially those designed to operate on the ocean floor, and more particularly to a method and apparatus for determining the angle of inclination with respect to the vertical assumed by such a unit during its operation and for leveling the seismic motion detectors carried by such a unit. Seismometers have become an integral component of geological research, especially oil and natural gas exploration. More recently a number of seismometers, commonly referred to as "ocean bottom seismometers" ("OBS's"), have been especially designed and built for remote operation on the ocean's floor in conjunction with such exploration. In such operations a seismic disturbance is artificially generated to create seismic shockwaves which pass through the earth and are refracted at interfaces of rock having diffusing densities. The refracted waves propate back to the earth's surface where they are sensed by seismic motion detectors carried in the seismometer. The use of OBS's poses certain problems not generally encountered in dry land seismometer operations. In seismic exploration on land, the persons deploying the seismic motion detector(s) used can take care to position it (them) so as to provide good seismic coupling to the earth. OBS's used today in deep water exploration are positioned either by being lowered on cables or, more generally, by being dropped in free fall from the ocean's surface. The user has minimal control over the placement of the OBS and generally has no idea of the precise nature of the surface on which the OBS has come to rest. Often, the OBS lands in a position which might not provide good coupling to the seismic waves which it is intended to record. The present invention is a simple and inexpensive method for determining the angle of inclination with respect to the vertical (hereinafter referred to simply as "the angle of inclination") assumed by a seismometer in its operating position, such as an OBS on the ocean floor, and an apparatus for preserving the orientation assumed by the seismometer for later measurement of that angle. Knowing the angle of inclination gives the user some idea of the contour of the ocean floor on which the OBS has fallen. This knowledge can also be used with other available information in later constructing the precise location of the unit on the ocean floor and in evaluating the data gathered and the causes of any failure to obtain data or suitable data. The present invention also assures good coupling of the seismic motion detector to the framework of the seismometer resting directly on the ocean bottom through which the seismic waves travel.

The present invention also comprises a method and apparatus for automatically leveling seismic motion detectors employed in a seismometer. Seismic motion detectors such as geophones are commercially available from numerous commercial sources and are in themselves beyond the scope of this invention. Generally, each such detector has a preferred "operating axis", either vertical or horizontal and will sense the component of motion occurring along an axis parallel to its operating axis. Thus, three orthogonally positioned detectors, one vertical and two horizontal, are needed to fully sense all components of seismic motion. Depending upon the nature of the geological investigation being undertaken, as few as one detector may be used. Means must be provided to align the vertically and horizontally operating detectors, where used, parallel and perpendicular to the vertical, respectively, for operation. Because of the nature of their remote operation, OBS's require self-leveling means for their seismic detectors. The use of gimbal arrangements for leveling OBS seismic motion detectors has been described by T. J. E. Francis et al., in the article "Ocean Bottom Seismograph", published in *Marine Geophysical Researches* 2 (1975), pp. 195-213 and by S. H. Johnson et al., in the article "A Free-Fall Direct-Recording Ocean Bottom Seismograph", published in *Marine Geophysical Researches* 3 (1975), pp. 103-117. Rex. V. Johnson II et al., in the article "A Direct-Recording Ocean Bottom Seismometer" published in *Marine Geophysical Researches* 3 (1977), pp. 65-85, described the use of a "boat" floating in a liquid in a hemisphere to level seismic motion detectors in an OBS. The present invention is a novel device for leveling such detectors and, more importantly, can more easily and inexpensively be used than either gimbals or a "boat" with a clamping device such as a spring loaded plunger to preserve the orientation assumed by the leveled seismic detectors so that the angle of inclination assumed by the seismometer can subsequently be determined.

RELATED APPLICATIONS

U.S. application Ser. No. 163,757, filed June 27, 1980 "On-bottom Seismometer Electronic System", Bowden et al. describes an electronic system for timing the various functions performed by an on-bottom seismometer. U.S. application Ser. No. 144,092, filed Apr. 28, 1980, Prior, "Release Mechanism for On-Bottom Seismometer", discloses a release mechanism for such a seismometer.

BRIEF SUMMARY OF THE INVENTION

One or more of the seismic motion detectors carried in a seismometer especially designed to operate on the ocean floor is suspended at the end of a shaft protruding from a ball rotating in an annular seat to form a free moving pendulum. A spring loaded plunger, positioned above the ball, is restrained from contact with its surface by a pin which passes perpendicularly through the plunger and is connected to a linearly acting solenoid. After the seismometer has been positioned for operation, the solenoid is activated by appropriate means causing the pin to be pulled from the plunger which, under the force of its spring, extends to contact the surface of the ball locking it, the shaft and detector(s) in their positions.

The detector(s), support means, solenoid and plunger are preferably mounted to the door of a water-tight instrument housing, a component of the seismometer. In the locked position, there is a rigid connection from the detector(s) through the support means to the door of the water-tight instrument housing which itself is rigidly mounted to the seismometer frame. The frame rests directly on the ocean floor when the seismometer is deployed. The water-tight instrument housing, which is preferably mounted on the lowest portion of the frame, will also tend to embed itself if the ocean floor is mud. This provides a good path for seismic waves traveling through the ocean floor to the chassis of the water-tight compartment. The seismic waves are, in turn, coupled through the rigid connection to the detector, thereby providing better recording of seismic refraction waves than has been provided with prior art devices. After recovery, the angle of inclination that the seismometer assumed with respect to the vertical at the time the ball was clamped can be determined by measuring the acute angle formed by the ball, shaft and detector(s) in their locked position and a surface known to be vertical when the seismometer is in the normal, up-right position it would assume on a flat, horizontal surface. The invention also comprises a method and apparatus for automatically leveling seismic motion detectors, when employed as the pendulum weight, for proper operation.

OBJECTS OF THE INVENTION

One object of the invention is to provide a simple and inexpensive method to determine the angle of inclination with respect to the vertical assumed by a recoverable device, such as a seismometer designed to operate on the ocean floor.

Another object of the invention is to provide a simple and inexpensive apparatus for preserving the orientation assumed by such a device so that its angle of inclination with respect to the vertical can later be determined.

Another object of the invention is to provide a mounting and clamp for a seismic motion detector which provide good acoustic coupling between the ocean bottom and the detector.

Another object of the invention is to provide a simple and inexpensive apparatus for self-leveling the seismic motion detectors used in a seismometer especially designed to operate on the ocean floor.

Another object of the invention is to provide an apparatus which both levels the seismic motion detectors carried in a seismometer especially designed to operate on the ocean floor and preserves the angle of inclination with respect to the vertical that the seismometer assumes during its operation.

BRIEF DESCRIPTION OF THE DRAWINGS

The previously stated features and objects of the present invention, as well as others, will appear more clearly upon reading the following description of the preferred embodiment of the invention depicted in the attached drawings, in which.

DESCRIPTION OF THE PREFERRED EMBODIMENT

Figure 1:
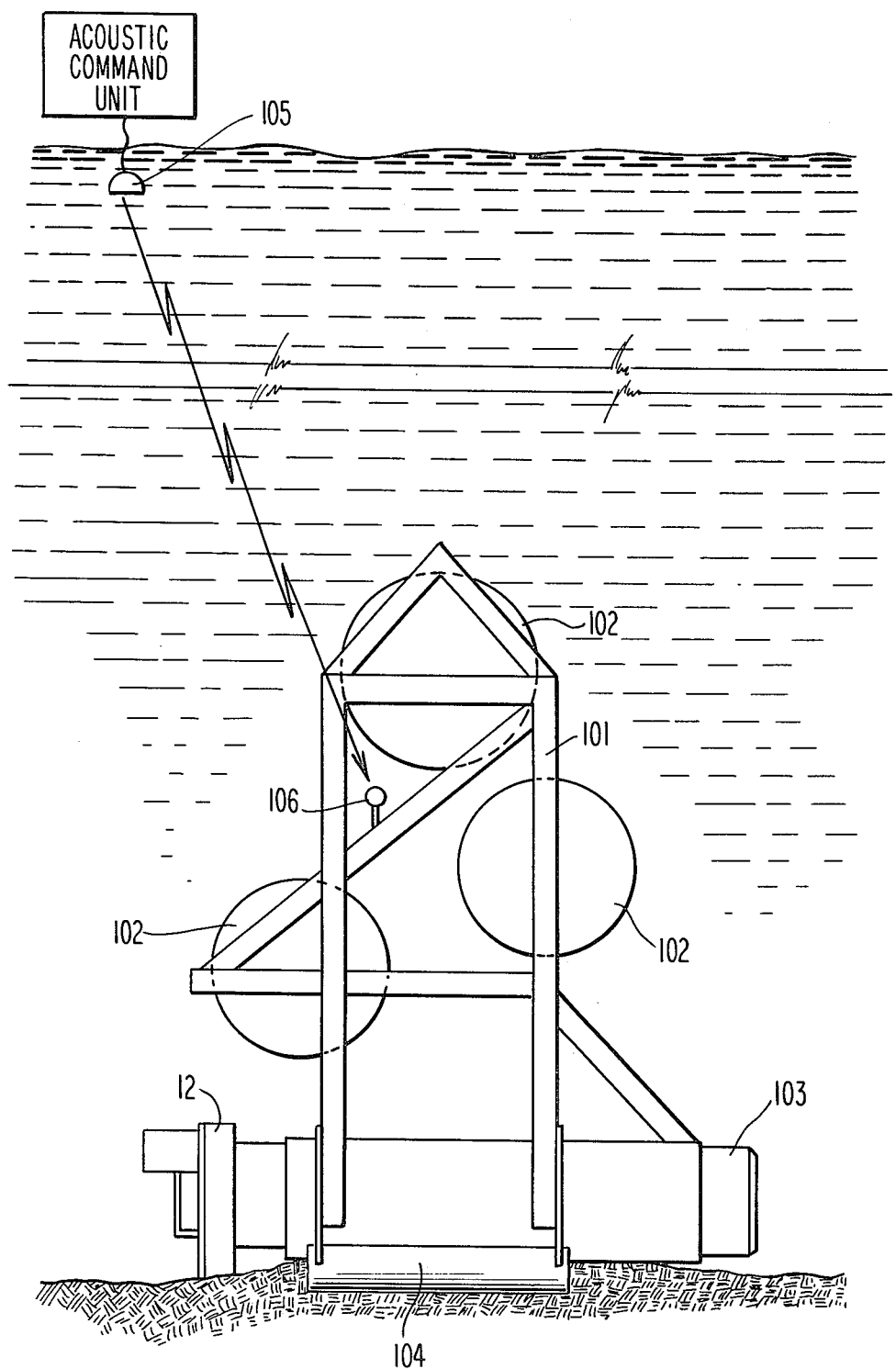
FIG. 1 is a view of the seismometer deployed on the sea-bottom.

Referring to FIG. 1, the on-bottom seismometer is of the type described in the aforementioned applications. Briefly, the major components of th OBS depicted in the FIG. 1 include a frame 101, floats 102, an instrument compartment 103 which is sealed, and a ballast tube 104. Power supplies can be carried in the instrument compartment 103, one or more of the floats 102 or both. An identical ballast tube 104 is mounted as the "rear" side of the seismometer viewed in FIG. 1. When the seismometer is deployed on the ocean-bottom, the ballast tubes 104 normally are submerged into the mud or silt of the sea floor. The ballast tubes 104 are rigidly mounted to the frame and provide good seismic coupling between the frame of the seismometer and the ocean bottom. The instrument compartment 103 is preferably mounted at the bottom of the frame 101 to improve the seismometer's stability during descent, ascent and operation. Mounted in this way the instrument compartment 103 will also be embedded when the seismometer comes to rest on a soft, muddy surface thereby improving the seismic coupling between it and the ocean floor. In accordance with one aspect of this invention, the seismic detector is mounted on the inside of the door 12 of the instrument compartment 103. In accordance with the invention, a rigid connection is provided between the detector and the frame 101 of the seismometer to provide a good acoutic path between the sea bottom and the detector.

An acoustic command unit 105 at the surface produces acoustic commands for the on-bottom seismometer. The commands are sensed by a hydrophone 106 mounted on the seismometer and wired to the instrument compartment 103. Such acoustic commands are used, for example, to trigger the clamping of the detector into position after deployment of the seismometer. Acoustic commands are also used to release the seismometer after recording is complete. A timer (not depicted) can alternatively be provided in the seismometer to trigger the clamping of the detector.

Figure 2:
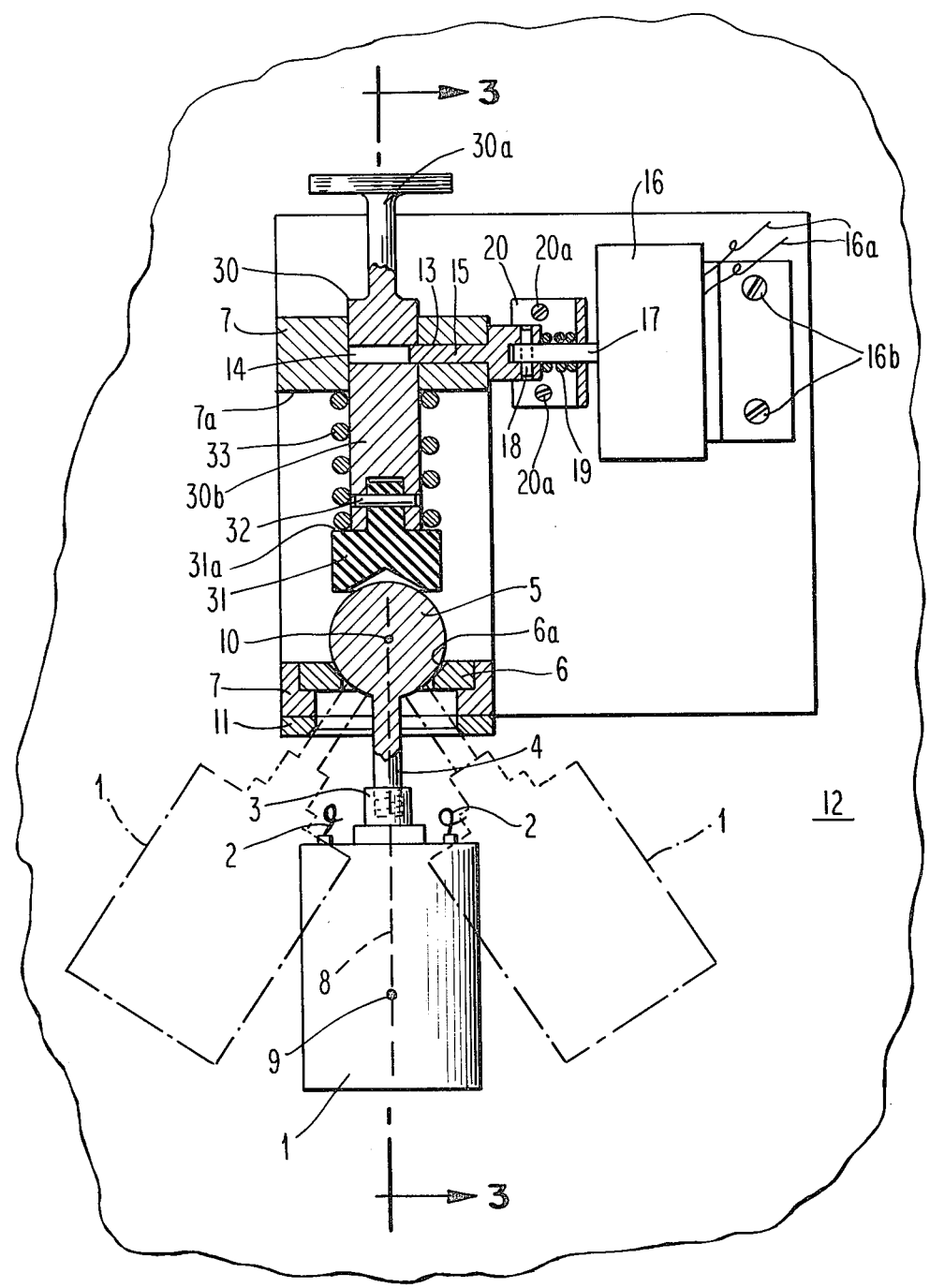
FIG. 2 is a partially cross-sectioned view of the invention mounting a single geophone.
Figure 3:
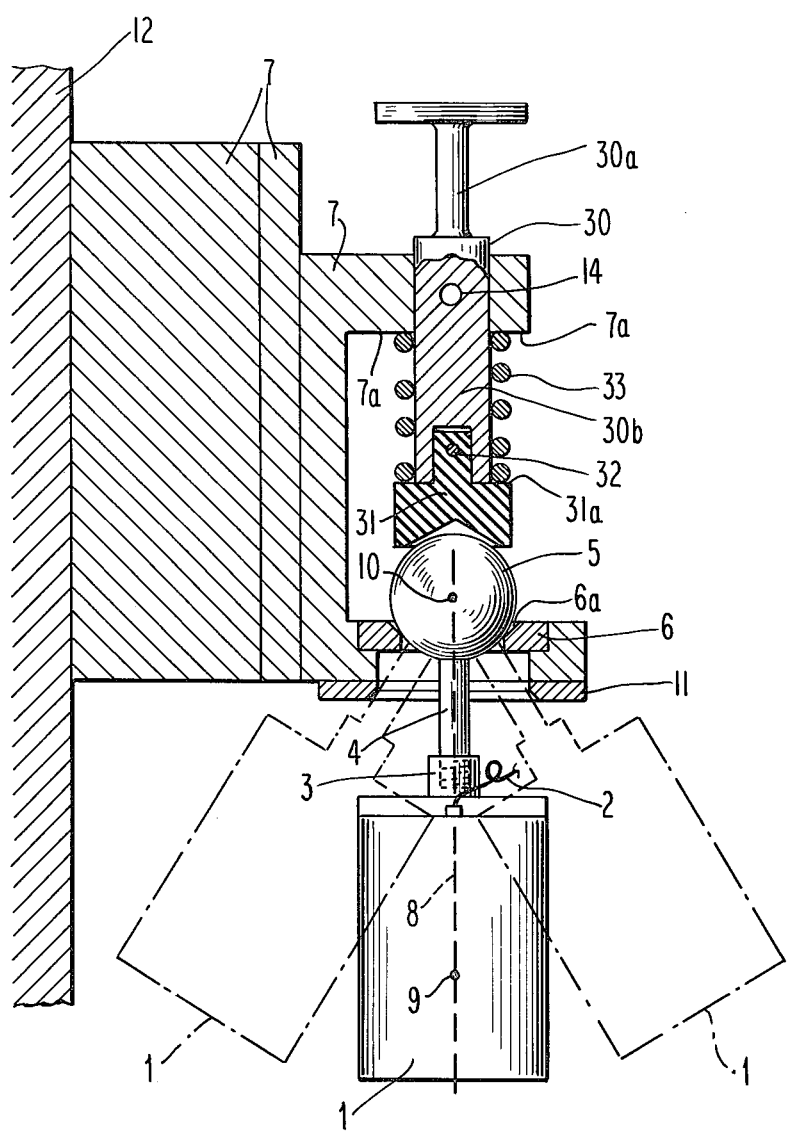
FIG. 3 is a partially cross-sectioned view taken along line 2—2 of FIG. 2.

FIG. 2 and FIG. 3 depict the preferred embodiment of the invention employed in a seismometer such as that depicted in in FIG. 1. A geophone 1, having a center of gravity 9 and a vertical operating axis (not depicted), is connected by a collar 3 or other suitable means to the end of a shaft 4 protruding from a spherical ball 5 having a center 10. Suitable means such as threading (depicted in FIGS. 1 and 2), glueing, etc. (not shown) are used to affix the collar 3 to the end of the shaft 4. The spherical ball 5 rests in an annular seat 6 provided in a mounting plate 7. To provide symmetrical freedom of motion to the geophone 1 and shaft 4, the annular plane formed within the circumference of the annular seat 6 should be horizontal when the seismometer in which the invention is installed is placed on a flat, horizontal surface. (Hereinafter this orientation of the seismometer shall be referred to as its "normal, up-right position".) The annular seat 6 is provided with a beveled face 6a for improved contact with the surface of the spherical ball 5. The geophone 1, shaft 4, and spherical ball 5, supported in this manner, form a simple pendulum. As a result of this arrangement, a line 8 passing through the center of gravity 9 of the geophone 1 and the center 10 of the spherical ball 5 will be vertically aligned when the geophone 1 is allowed to hang freely at the end of the shaft 4. Ideally, the center of gravity 9 should be located along a line passing through the center 10 of the spherical ball 5 and the central longitudinal axis of the shaft 4, as the line 8 is depicted to run in FIG. 2, to more easily measure the angle assumed by the geophone 1 and shaft 4 when locked into operating position while the seismometer is pitched over, but this alignment is not required to proper operation of the invention. Leads 2 carry the electrical signals between the geophone 1 and appropriate processing and recording equipment (not shown). Geophones and comparable seismic motion detectors are available from a number of commercial sources and are well-known. In the alternative to the vertical geophone depicted in the figures, a horizontal-type seismic motion detector or several seismic motion detectors can be mounted at the end of the shaft 4. The manner of mounting the detectors directly to the end of the shaft 4 or on or in a frame (not depicted) for mounting to the shaft 4 and the arrangement of the detectors are matters of personal preference. The construction, mounting and operation of such detectors are well known to those familiar with seismometer construction. It is only necessary that each detector be mounted with its operating axis parallel (if a "vertical" motion detector) or perpendicular (if a "horizontal" motion detector) to the line 8. Preferably, the detectors should also be mounted in such a way that the line 8 which will pass through the center of gravity of the detector or assembly of detectors coincides with the line passing through the central longitudinal axis of the shaft 4, again for ease of measuring the angle of inclination. Suspended in this fashion, each detector will be automatically aligned with respect to the vertical for proper operation by the pendulum action of the invention.

A stop ring 11 is preferably provided in the mounting plate 7 to prevent damage to the seat 6 which might occur if it were allowed to be struck by the side wall of the shaft 4, during handling or placement of the seismometer mounting the invention. Preferably the centers of the open planar areas formed within the circumferences of the annular seat 6 and stop ring 11 should lie along the line 8 when the seismometer is in its normal, up-right position to assure symmetrical freedom of motion of the geophone 1 and shaft 4 perpendicular to the vertical. The positions of geophone 1 at its outer limits of travel with the stop ring 11 installed are depicted in phantom in both FIG. 2 and FIG. 3. Although a total arc of less than 90° is illustrated, the inner diameter of annular seat 6 could be increased to a small fraction of an inch less than the diameter of the spherical ball 5 and that of the stop ring 11 also increased to allow a total arc of movement greater than 90° but less than 180°. If so constructed this would allow the invention to operate properly until the seismometer is pitched over at almost 90° from its normal, up-right position.

The mounting plate 7 is affixed by suitable means inside the instrument compartment 103 to the planar surface of its door 12. The door 12, which pivots around a vertical axis, is an ideal surface on which to mount the detector as it offers easy access to "cock" a plunger 30 for operation, as will be later described, and simplifies measuring the angle assumed by the geophone 1 and shaft 4 when clamped. The mounting plate 7 is designed to prevent the geophone 1 from striking other surfaces including the inner surface of the door 12. (See FIG. 3). If the invention is used to level one or more seismic motion detectors, the seismometer and enclosure are constructed of suitable materials and in such a way that seismic vibrations are transmitted without significant dampening or filtering from the ocean floor on which the seismometer lies to the surface of the door 12 supporting the invention. Similarly, the means by which the mounting plate 7 is attached to the door 12 and the material from which the mounting plate 7, annular seat 6, spherical ball 5, shaft 4, and collar 3 are constructed are suitable to transmit seismic vibrations without dampening or filtering to the geophone 1. Those knowledgeable with seismometer construction will be familiar with the variety of materials and techniques available to them for constructing the invention.

As depicted in FIGS. 2 and 3, the mounting plate 7 is adapted to receive a plunger shaft 30b which is the central body of the plunger 30. A head 31 is mounted by suitable means, such as a clevis 32, to the end of the plunger shaft 30b closest to the spherical ball 5. The plunger 30 should be positioned on the mounting plate 7 in such a way that when the plunger 30 is extended, its head 31 comes into sufficient contact with the surface of the spherical ball 5 so as to lock the spherical ball 5, shaft 4 and geophone 1 in their assumed orientation. Preferably, the plunger 30 should also be positioned so that a line extending through the central longitudinal axis of the plunger shaft 30b also passes through the center 10 of the spherical ball 5 and the center of the open planar area formed within the circumference of the annular seat 6. This will reduce the likelihood of the plunger 30 imparting a torsional force to the spherical ball 5 when striking it, disturbing the position of the shaft 4 and cylinder 1. The head 31 should be constructed of synthetic rubber of other material suitable to cushion the impact of the plunger 30 when it strikes the surface of the spherical ball 5 so as not to disturb its position or that of the geophone 1 and to grip the surface of the spherical ball 5 so that it does not subsequently rotate. Although not required for proper operation of the invention, the end of the plunger 30 opposite the head 31 is preferably shaped into a handle 30a allowing that end of the plunger to be more easily gripped.

A coil spring 33 is positioned around the plunger shaft 30b. Suitable surfaces such as an overhand 31a of the head 31 and a surface 7a of the mounting plate 7 are provided as a means for compressing the coil spring 33. The coil spring 33 must be selected so as to remain in a sufficiently compressed state when the plunger 30 is fully extended to assure that sufficient forces are imparted by the head 31 to the spherical ball 5 to prevent its further motion or rotation and to further assure that the spherical ball 5 is firmly pressed against the annular seat 6 so as to provide an adequate path for seismic vibrations from the annular seat 6 to the geophone 1.

A first bore 13 is provided in the mounting plate 7 to allow the passage of a pin 15. A second bore 14 is provided in the plunger shaft 30b to receive the pin 15. The purpose of the pin 15 is to restrain the plunger 30 away from the surface of the spherical ball 5 and the first bore 13 and second bore 14 must be suitably located to accomplish this when the pin 15 is positioned within them.

A solenoid 16 is provided as a means for removing the pin 15. The solenoid 16 is mounted to the mounting plate 7 or some other suitable surface by screws 16b or suitable means. A power source (not depicted) supplies electric current through a set of solenoid leads 16a to activate the solenoid 16. The solenoid 16 in FIG. 2 is depicted as having a linearly acting shaft 17 connected by a clevis 18 or other suitable means to an end of the pin 15. This mechanical linkage enables the pin 15 to be removed from the bore 14 in the plunger shaft 30b by the solenoid 16 when the latter is activated. Solenoids equipped with linearly acting shafts are available from a variety of commercial sources and their operation is well-known. Alternatively, any other device which can be activated to produce a linear stroke action adequate to remove the pin 15 from the plunger shaft 30b could be used in place of the solenoid 16 and linearly acting shaft 17.

In the preferred embodiment of the invention depicted in FIG. 2, a second coil spring 19 is positioned around the linearly acting shaft 17. A second plate 20, attached by screws 20a or other suitable means to the mounting plate 7 is provided as a surface against which the second coil spring 19 may be compressed. A face of the solenoid 16 may prove to be adequate for this purpose. The clevis 18 at the end of the pin 15 provides a suitable second surface against which the second coil spring 19 may be compressed. The purpose of the second coil spring 19 is to push the pin 15 to the left, as viewed in FIG. 2, to engage the second bore 14 when the first bore 13 and second bore 14 are aligned.

The operation of the invention is as follows. Before deploying the seismometer carrying the invention, the plunger 30 is cocked for operation by lifting it by its handle 30a and rotating it until the first bore 13 and second bore 14 align. At that point the second coil spring 19 in compression, forces the pin 15 to the left (as viewed in FIG. 2) causing the pin 15 to pass into the second bore 14 and engage the plunger shaft 30b restraining the head 31 from contacting the surface of the spherical ball 5. The seismometer carrying the invention is then deployed for operation as shown in FIG. 1. Once the unit is deployed, the line 8 passing through the center of gravity 9 of the geophone 1 (which is free to swing at the end of the shaft 4) and the center 10 of the spherical ball 5 is immediately and automatically aligned with respect to the vertical by the pendulum action of the invention. The geophone 1, which has been mounted with its vertical operating axis parallel to the line 8, is now positioned for proper operation. After the seismometer has been given an adequate amount of time to stabilize, an electric current is introduced from a power source (not shown) through the solenoid leads 16a activating the solenoid 16 causing the linearly acting shaft 17 to be moved to the right (as viewed in FIG. 2) withdrawing the pin 15 from the second bore 14. The coil spring 33 in compression forces the head 31 of the plunger 30 into contact with the surface of the spherical ball 5 locking it, the shaft 4 and the geophone 1 in their assumed positions. The acute angle formed by the line 8 when the geophone 1 is in its clamped position and in the position it assumes when hanging freely in the seismometer in the latter's normal, up-right position is the angle of inclination assumed by the seismometer. If the line 8 passes through the central longitudinal axis of the shaft 4, the angle of inclination can be determined by measuring the acute angle between the longitudinal side wall of the shaft and a surface, such as the door 12 or one of the walls of the instrument housing 103, known to be vertical when the seismometer is in its normal, up-right position.

Not included as part of the invention and heretofore omitted from this description has been the means by which the current to activate the solenoid 16 is controlled. Several methods, such as internal timers and acoustic signals can be used with on-bottom seismometers to activate switches. For example, a system which can be used for controlling the supply of electrical power to the solenoid 16 is described in the related U.S. application Ser. No. 163,757, filed June 27, 1980, "On-Bottom Seismometer Electronic System", Bowden et al. It is expected the user will select a method for activating the solenoid 16 or other device provided to remove the pin 15 from the plunger 30 which is most compatible with the other features of his seismometer.

Although the principles of the present invention have been described above in relation to a preferred embodiment, it must be understood that the description is only made by way of example and does not limit the scope of the invention.

What is claimed is:

1. In an ocean-bottom seismometer unit which includes a frame and a seismic motion detector for detecting seismic waves when said unit is deployed on the ocean bottom and which unit is subsequently recovered at the water's surface for retrieval of recorded seismic wave data, a device for leveling said seismic motion detector comprising:
    a ball having a protruding shaft;
    means for attaching said seismic motion detector to said shaft;
    support means for said ball so that said seismic motion detector hangs from said ball and shaft in a pendular fashion; and
    means for locking said ball in its assumed position so that seismic waves are conducted through the frame of said ocean-bottom seismometer, said means, said ball, and said shaft to said seismic motion detector to provide improved coupling of seismic waves to said seismic motion detector.

2. The device recited in claim 1 wherein said means for locking said ball comprises:
    a plunger; and
    means for extending said plunger into contact with said ball.

3. The device recited in claim 2 wherein said means for locking further comprises:
    a pin;
    said plunger having a shaft adapted for receiving said pin;
    a coil spring positioned around said shaft of said plunger; and
    means for removing said pin from said plunger whereby said plunger is extended by said coil spring into contact with said ball.

4. The device recited in claim 3 wherein said means for removing said pin from said plunger comprises:
    a remotely actuated solenoid; and
    means for removing said pin from said plunger by said solenoid.

5. The device recited in claim 4 wherein said solenoid has a linearly acting retracting shaft and said device further comprises:
    means for connecting said linearly acting retracting shaft to said pin whereby said pin is removed from said plunger by activating said solenoid.

6. The device recited in claim 5 further comprising a second coil spring positioned around and axially parallel with said linear acting retracting shaft whereby said pin is moved to engage said plunger.

* * * * *